United States Patent [19]

Bando

[11] Patent Number: 5,413,263

[45] Date of Patent: May 9, 1995

[54] APPARATUS FOR BREAKING PLATE GLASS

[75] Inventor: Shigeru Bando, Tokushima, Japan

[73] Assignee: Bando Kiko Co., Ltd., Tokushima, Japan

[21] Appl. No.: 139,062

[22] PCT Filed: Jul. 3, 1991

[86] PCT No.: PCT/JP91/00893

§ 371 Date: Feb. 4, 1992

§ 102(e) Date: Feb. 4, 1992

[87] PCT Pub. No.: WO92/00922

PCT Pub. Date: Jan. 23, 1992

Related U.S. Application Data

[63] Continuation of Ser. No. 829,039, Feb. 4, 1992, abandoned.

[30] Foreign Application Priority Data

Jul. 5, 1990 [JP] Japan ................ 2-179139

[51] Int. Cl.⁶ ............................................. C03B 33/033
[52] U.S. Cl. ..................................... 225/96.5; 225/97; 225/103
[58] Field of Search ............. 225/94, 95, 96.5, 97, 225/103; 83/559, 863, 865; 65/174, 176

[56] References Cited

U.S. PATENT DOCUMENTS

| | | | |
|---|---|---|---|
| 3,520,457 | 7/1970 | Augustin | 225/97 X |
| 3,740,524 | 6/1973 | Dahlberg et al. | 225/96.5 X |
| 3,917,139 | 11/1975 | Kabanov et al. | 225/96.5 |
| 4,049,167 | 9/1977 | Guissard | 225/96.5 X |
| 4,109,841 | 8/1978 | DeTorre | 225/97 X |
| 4,151,940 | 5/1979 | Nuding et al. | 225/96.5 |
| 4,227,635 | 10/1980 | Delettre | 225/97 X |
| 4,278,193 | 7/1981 | Pereman et al. | 225/96.5 X |
| 4,454,972 | 6/1984 | Maltby, Jr. et al. | 225/96.5 |
| 4,471,895 | 9/1984 | Lisec, Jr. | 225/96.5 X |
| 4,610,408 | 9/1986 | Box et al. | 225/103 X |
| 4,698,088 | 10/1987 | Bando | 225/96.5 X |
| 5,221,034 | 6/1993 | Bando | 225/96.5 |
| 5,301,867 | 4/1994 | Bando | 225/96.5 X |

FOREIGN PATENT DOCUMENTS

| | | | |
|---|---|---|---|
| 0217658 | 4/1987 | European Pat. Off. | |
| 2397369 | 7/1978 | France | |
| 1496440 | 4/1965 | Germany | 65/174 |
| 2731230 | 6/1978 | Germany | |
| 54-70315 | 6/1979 | Japan | |
| 62-78123 | 4/1987 | Japan | |
| 1-37337 | 8/1989 | Japan | |
| 2000759 | 1/1979 | United Kingdom | |

OTHER PUBLICATIONS

Patent Journal, Aug. 1979 Spreng Germany No. P 27 31 230.7 Nov. 7, 1977 "Plate Glass Cutting Machine".

Primary Examiner—Rinaldi I. Rada
Assistant Examiner—Clark F. Dexter
Attorney, Agent, or Firm—Nixon & Vanderhye

[57] ABSTRACT

An apparatus for breaking plate glass, comprising a breaking mechanism (9), (10) which presses and breaks a portion of the plate glass (1) on which a cutting line is marked; a linear-sliding mechanism (6) which moves the breaking mechanism (9), (10) along a surface of the plate glass (1); a suction device (21) which lifts the plate glass (1); a supporting base (39) which supports the plate glass (1) in plane: a glass support (37) which supports the plate glass (1); a crack developing device (38) which develops a crack in the plate glass (1); a linear-sliding device (35) which moves the glass support (37) and the crack developing device (38) along the surface of the plate glass (1); and a control device which controls the breaking operation of the breaking mechanism (9), (10) as well as the operations of the linear-sliding mechanisms (6), (35) and the crack developing device (38), the control device being so adapted to control the linear-sliding device (35) so as to move the glass support (37) and the developing cracks device (38) to a position opposite to the position where the breaking mechanism (9), (10) has moved.

7 Claims, 2 Drawing Sheets

APPARATUS FOR BREAKING PLATE GLASS

This is a continuation of application Ser. No. 07/829,039, filed Feb. 4, 1992, now abandoned.

FIELD OF THE INVENTION

The present invention relates to an apparatus suitable for breaking unshaped plate glass, e.g., to form a glass pane for an automobile.

BACKGROUND ART

Currently, glass panes applied to automobiles have increased thickness, for example, have a thickness of five to six millimeters.

In a conventional apparatus for breaking plate glass, plate glass on which a cutting line is formed is placed on a template by a belt, and pressed to be broken forcibly by an end cutter or pressing device. However, when the plate glass is thick as described above, a sufficient crack is not developed or does not advance although the cutting line is provided on the glass by means of stronger cutter pressure. In the forcible breaking by the above conventional breaking apparatus, the glass may not be accurately broken along the cutting line, but may be chipped, or sometimes cracked. In such case, these deficiencies cannot be cured even if the polishing work or other works are performed in the following processes.

In view of the above, it is an object of the present invention to provide an apparatus for breaking plate glass which makes cracks in the glass and then breaks the glass, even if the glass in which a crack is not sufficiently developed is supplied to the apparatus.

Another object of the present invention is to provide an apparatus for breaking glass plate which eliminates the use of a template required by conventional apparatus for breaking glass.

DISCLOSURE OF THE INVENTION

According to the present invention, the above objects are achieved by an apparatus for breaking plate glass, comprising a belt conveyor including a belt for conveying plate glass placed thereon, a breaking mechanism disposed above the belt for pressing the plate glass-and thereby-breaking the same along a cutting line formed on the plate glass placed on the belt, first moving means for moving the breaking mechanism relative to the plate glass in a plane parallel to the plate glass on the belt, a lifter provided above the belt for lifting the plate glass which is on the belt, a supporting base for supporting the plate glass on the belt through the belt, a movable glass support disposed under the belt for supporting the plate glass through the belt, a movable crack developing device disposed under the belt for developing a crack in the cutting line of the plate glass through the belt, second moving means for moving the glass support and the crack developing device in a plane parallel to the surface of the-plate glass to position the glass support and the crack developing device in registration with the breaking mechanism moved by the first moving means.

In one embodiment, the breaking mechanism according to the present invention comprises an end cutter for forming a cutting line for an end cutting on the plate glass which is on the belt and a press device for pressing the plate glass in the vicinity of a portion of the plate glass on which the cutting line is formed to thereby break that portion of the glass formed with the cutting line.

The present invention is also applicable to apparatus for breaking additional kinds of plate glass, for example, table top glass, and is not limited to the glass panes for use in automobiles.

The apparatus for breaking plate glass according to the present invention are preferably arranged such that the breaking operation and conveyance of the plate glass are performed by the numerical control system.

The present invention will be described hereinafter in more detail with respect to the embodiments thereof shown in the drawings. By this description, the above invention and its advantages as well as other inventions and their advantages will be clarified.

BEST MODE FOR CARRYING OUT THE INVENTION

Figure 1:
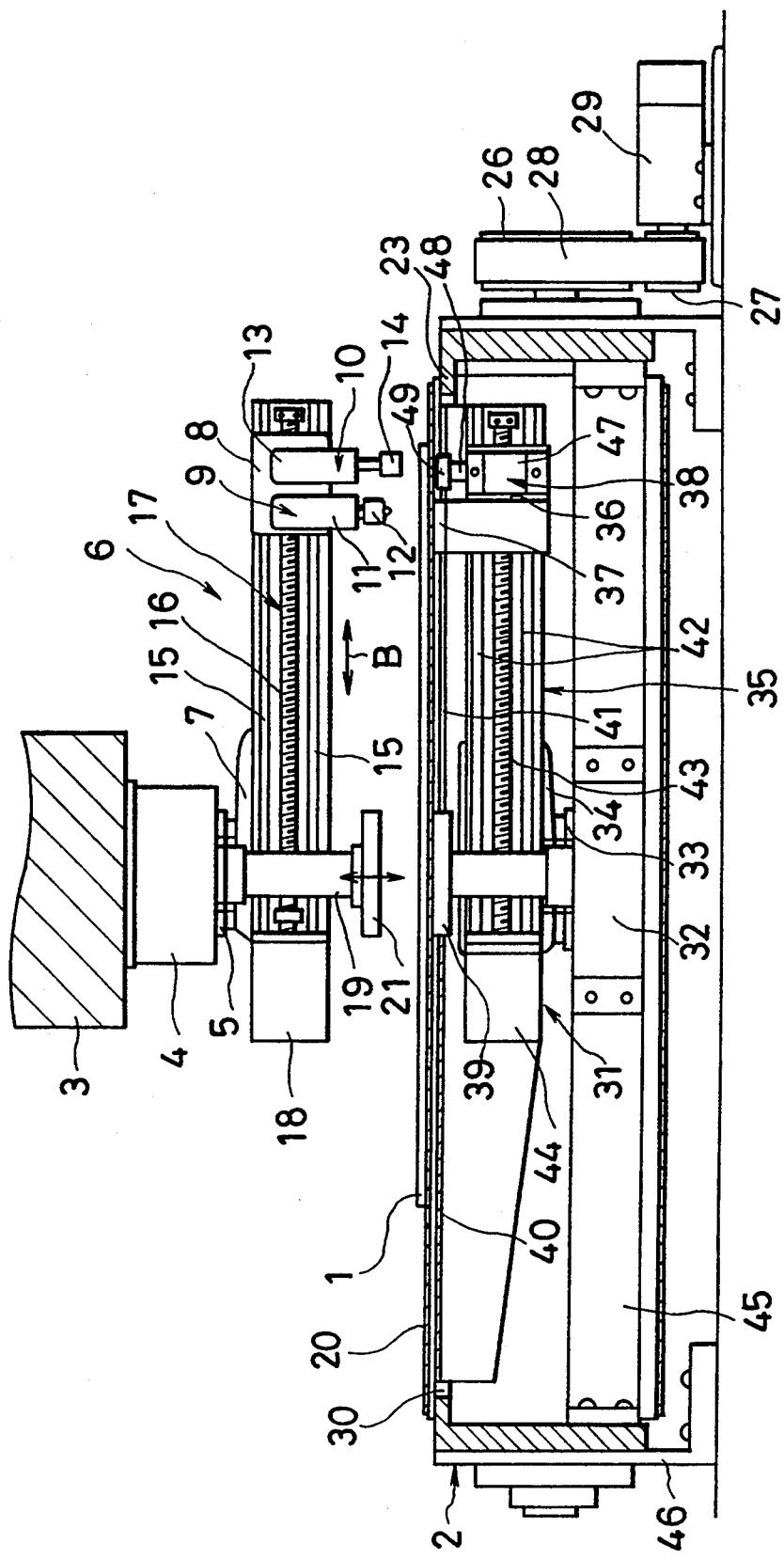
FIG. 1 is a front view of a breaking apparatus according to the present invention.
Figure 2:
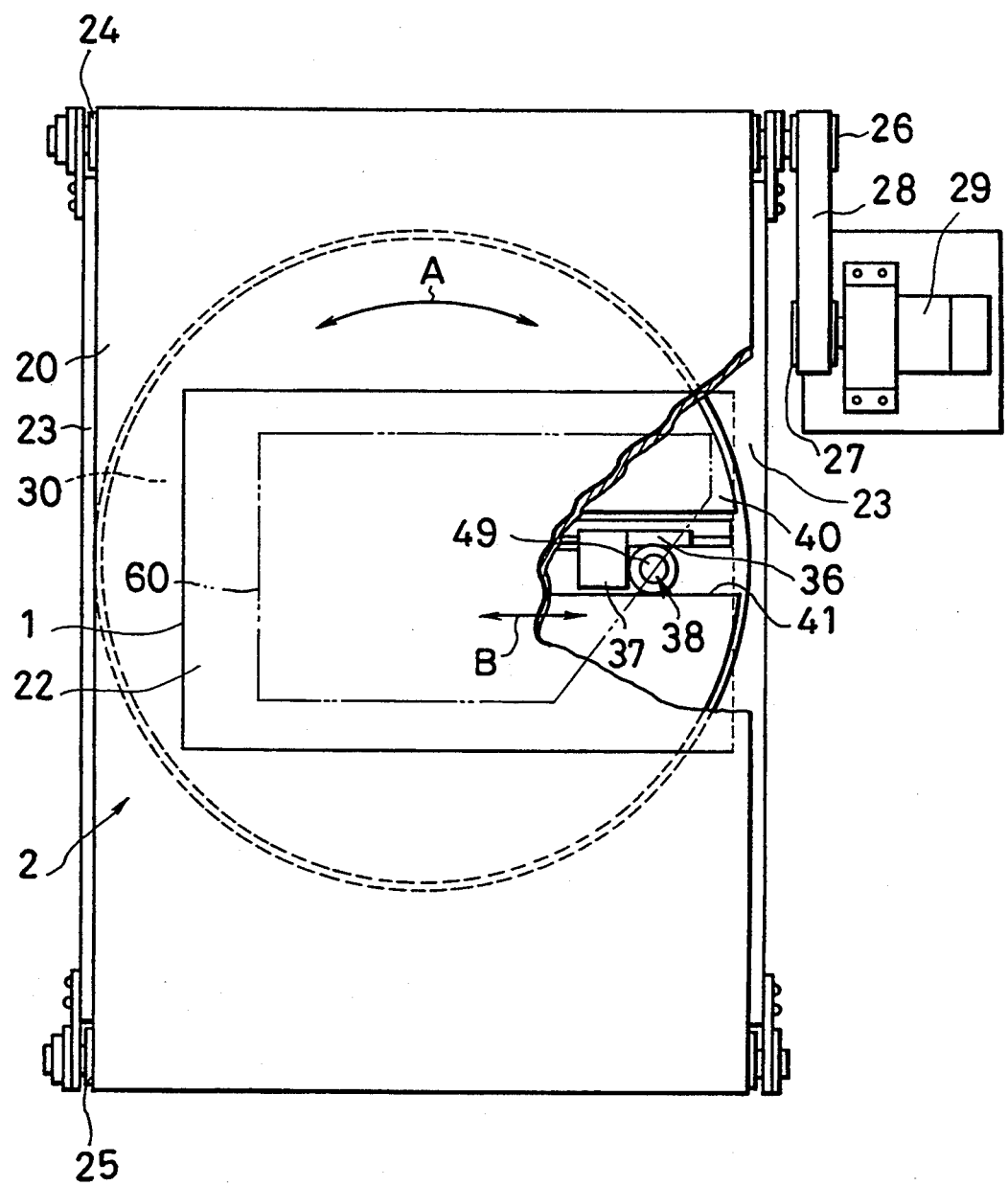
FIG. 2 is a plan view of the breaking apparatus shown in FIG. 1.

Referring to FIGS. 1 and 2, a first motor 4 is secured to a frame 3 above a conveyor belt 20 of belt conveyor 2 on which plate glass 1 is placed, above the motor 4 lying above the center of the belt conveyor 2, i.e., above the center of the plate glass 1 that is put on the belt. The first motor 4 is secured such that its rotating shaft is perpendicular to an upper surface of the conveyor belt 20 of the belt conveyor 2. A first linear-sliding device 6 is attached directly or through a bracket 7 to a movable member 5 connected to the rotating shaft of the first motor 4. The first linear-sliding device 6 is rotated in the direction A (FIG. 2) parallel to the plate glass 1 above the belt conveyor 2 by the actuation of the first motor 4, and a slider 8 of the device 6 is moved linearly in the direction B, i.e., parallel to the plate glass 1. An end cutter 9 and a press device 10 used as a breaking mechanism are secured side by side to the slider 8 of the first linear-sliding device 6, facing the belt conveyor 2. Therefore, the end cutter 9 and the press device 10 are moved in steps and positioned in a polar coordinate system above the belt conveyor 2, in other words, parallel to and above plate glass 1 by the actuation of the first motor 4 and the first linear-sliding device 6.

End, cutter 9 and the press 10 may, however, be moved in an X-Y orthogonal coordinate system instead of a polar coordinate system.

The end cutter 9 is so adapted that a cutter wheel block 12 is attached to an end of the piston rod of an air cylinder 11 that is moved toward or away from the plate glass 1. The press device 10 is so adapted that a push bar 14 is attached to an end of the piston rod of an air cylinder 13 that is also moved toward or away from the plate glass 1. The first motor 4 composed of a motor with the rotating position detector is connected to a drive unit and a controller and the like, and is subjected to digital servo control by a control device (not shown). The control device of the first motor 4 also includes an information memory for position instruction inputs, speed instruction inputs, a memory reader, and so on.

The linear-sliding device 6 generally comprises a driver 17 which includes a guide rail 15 and a threaded shaft 16, and a servo motor 18 connected to the threaded shaft 16. The slider 8, which is screwed over the threaded shaft 16 is servo-fed such as step driving and the like by the actuation of the servo motor 18 by the control device. The control device, which controls the servo motor 18 includes a memory write unit, a memory reader, a teaching receiver, a data sender, and a CPU.

A fixed hollow tube 19 is disposed at the center of rotation of the first motor 4. A suction device 21 which is moved toward or away from the conveyor belt 20 of the belt conveyor 2 is secured to the hollow tube 19. The suction device 21 lifts an inner part of the plate glass from the outer (edge) part 22, which is broken away, to leave the cullet i.e., the outer edge part 22, on the conveyor belt 20 of the belt conveyor 2. The separated cullet is discharged out by the conveyor belt 20.

The belt conveyor 2 comprises a conveyor belt 20 on which the plate glass 1 is placed. A supporting plate 23 supports a lower surface of the conveyor belt 20, drums 24 and 25 are provided around which conveyor belt 20 extends. Pulleys 26, 27, a belt 28 and a motor 29 are provided for rotating the drum 24 and advancing the conveyor belt 20. The supporting plate 23 is bored in the form of a circle in correspondence to an area where the plate glass is put, and a device 31 for supporting plate glass is provided in the bore 30.

Concerning the supporting device 31 for plate glass, a second motor 32 is disposed at the center of the device. A second linear-sliding device 35 is attached through a bracket 34 to a rotating part 33 connected to the output rotating shaft of the second motor 32 and is parallel to an upper surface of the conveyor belt 20. A glass support 37 which supports the plate glass 1 through the conveyor belt 20 as well as a crack developing device 38 which develops crack along a cutting line 60 of the plate glass 1 are attached to the slider 36 of the second linear-sliding device 35.

An upstanding supporting base 39 which supports the plate glass 1 and the conveyor belt 20 in a plane is mounted on the central fixed part of the second angle motor 32. An upper surface of the supporting base 39 is almost flush with the supporting plate 23 which supports the conveyor belt 20. The central axis of rotation shaft of the second motor 32 is perpendicular to the supporting base 39 and the supporting plate 23. The second linear-sliding device 35 secured to the rotating part 33 directly or through the bracket 34 is rotated in a plane parallel to the upper surface of the supporting base 39 as well as the upper surface of the conveyor belt 20 of the belt conveyor 2, and around the supporting base 39 horizontally in a controlled manner.

A belt supporting plate 40 which supports the conveyor belt 20 is held by the linear-sliding device 35 so as to be rotated in the direction A together with the sliding device 35. The belt supporting plate 40 is formed with a cutout 41 extending along a moving path in the direction B of the glass support 37 as well as the crack developing device 38.

The second motor 32 has the same function as the first motor 4 of the breaking section and, of course, is controlled in driving operation thereof by the control device. The second linear-sliding device 35 that comprises a rail 42, a threaded shaft 43 screwed into the slider 36, and a motor 44, the output rotating shaft of which is connected to the threaded shaft 43, has the same function as the first linear-sliding device 6, and is similarly controlled by the control device in driving operation thereof.

The second motor 32 is held by a conveyor frame 46 through a bracket 45. The slider 36 of the second linear-sliding device 35 is moved in sequence to the required position under the plate glass 1, i.e., under the cutting line in a polar coordinate system by a linear movement in the direction B and by angle movement in the direction A of the second motor 32 numerically controlled by the control device.

The slider 36 of the second linear-sliding device 35 is equipped with the glass support 37 which supports the plate glass 1 in plane and the crack developing device 38 which is secured in juxtaposition with the glass support 37. The upper surface of the glass support 37 is planar and almost flush with the supporting base 39. On the other hand, the crack developing device 38 comprises an air cylinder device 47 attached to the slider 36 through a bracket. A knocker 49 fixed to a piston rod 48 of the air cylinder device 47 so as to knock a lower surface of the plate glass 1 which is supported by the supporting base 39. In order to develop a crack, the air cylinder device 47 is actuated intermittently to cause the knocker 49 to knock the plate glass under the cutting line.

Another arrangement for developing cracks may be such that a roller (not shown) is attached rotatably to the piston rod 48 of the air cylinder device 47 instead of the knocker 49, wherein the roller is pressed against the plate glass 1 through the conveyor belt 20 by the actuation of the air cylinder device 47, and is caused to follow the cutting line below the plate glass to develop a crack under the control of the second motor 32 and the second 11near-sliding device 35.

In the state where the plate glass 1 placed on the belt conveyor 2 is pressed and fixed by the supporting base 39 of the supporting device 31 and the suction device 21 of the breaking section, the end cutter 9 and the press device 10 are positioned in sequence at a previously stored position by rotation in the direction A around the center of the plate glass 1 under actuation of the first motor 4 and a linear movement in the direction B under actuation of the first linear-sliding device 6 above the plate glass 1 and then perform an end cutting operation and a pressing operation. During these operations, the glass support 37 of the supporting device 31 and the crack developing device 38 are moved in a polar coordinate system on the basis of the previously stored program to support the plate glass from below, the same portion which is subjected to the end cutting or pressing operation.

To sum up, the glass support 37 is moved in accordance with the movement of the end cutter 9 and the press device 10, in line with the program previously memorized.

According to the present invention as described above, when thick plate glass 1 with a cutting line in which the crack is insufficiently developed, is supplied to the conveyor 2, the crack is firstly developed by the crack developing device 38 at the portion of the plate glass 1 where the crack is developed insufficiently, and then the breaking operation is performed by operating the breaking mechanism which includes the end cutter 9 and the press device 10. Thus, when the plate glass 1 is supported at the center thereof by the supporting base 39 through the conveyor belt 20 as well as pressed and fixed by the supporting base 39 and the suction device 21, the crack developing device 38 of the supporting device 31 for plate glass is moved to the place on the glass where the crack is insufficient. At the same time, the press device 10 of the breaking mechanism above the conveyor 2 is moved to the position opposite to the position where the crack developing device 38 is placed. Under such conditions, the plate glass 1 is slowly pressed from above by the press device 10, and the crack developing device 38 is actuated under the plate glass 1 to knock the plate glass 1 from below to thereby develop a crack in the cutting line on the glass. After the process of developing a crack is completed, the end cutter 9 and the press device 10 are positioned in sequence at the previously stored position above the plate glass 1 by rotating around the center of the plate glass 1 under actuation of the motor 4 and the linear movement under actuation of the linear-sliding device 6 and perform an end cutting operation and a pressing operation. During these operations, the glass support 37 of the supporting device 31 is moved in a polar coordinate system in accordance with a program previously stored to support from below the portion of the plate glass 1 where the end cutting operation or pressing operation is performed. In this way, the end cutting or pressing operation is performed on the plate glass to break the same along the cutting line 60.

Thus, even thick plate glass 1, in which it is difficult to develop the crack, is accurately broken fine along the cutting line 60.

I claim:

1. An apparatus for breaking plate glass, comprising:
   belt conveyor means including a belt for conveying plate glass placed thereon;
   movable breaking means disposed above the belt for pressing the plate glass and thereby breaking the same along a cutting line formed on a surface of the plate glass placed on the belt, said breaking means being movable in a first plane parallel to an upper surface of the belt on which the plate glass is placed;
   first moving means for moving the breaking means relative to the belt in the first plane parallel to the upper surface of the belt;
   lifting means provided above the belt for lifting the plate glass which is on the belt;
   supporting means underneath the belt for supporting the plate glass which is on the belt through the belt, the supporting means including a belt supporting plate which is rotatable in a second plane parallel to the upper surface of the belt and has a cutout;
   movable glass support means disposed under the belt for providing additional support for the plate glass through the belt, said glass support means being movable in the second plane parallel to the upper surface of the belt;
   movable crack developing means disposed under the belt for developing a crack in the cutting line of the plate glass through the belt, said crack developing means being movable in the second plane parallel to the upper surface of the belt;
   second moving means for moving the glass support means and the crack developing means in the second plane parallel to the upper surface of the belt in a polar coordinate system to position the glass support means and the crack developing means in alignment with the breaking means moved by the first moving means, said second moving means being adapted to rotate the belt supporting plate in the second plane to position the cutout, the glass support means and the crack developing means in alignment with the breaking means, whereby the glass support means and the crack developing means support the plate glass and develop the crack to the plate glass, respectively, through the cutout.

2. An apparatus as claimed in claim 1, wherein the breaking means comprises an end cutter means for forming an end cutting line on the plate glass placed on the belt, and pressing means for pressing the plate glass in the vicinity of a portion of the plate glass on which the cutting line is formed, to thereby break the plate glass along the cutting line.

3. An apparatus as claimed in claim 1, wherein the lifting means comprising sucking means for sucking the plate glass placed on the belt for lifting the plate glass from the belt.

4. An apparatus as claimed in claim 1, wherein the crack developing means comprises knocking means for knocking an undersurface of the plate glass through the belt, the undersurface opposing the surface of the plate glass on which the cutting line is formed.

5. An apparatus as claimed in claim 4, wherein the knocking means comprises an air cylinder means, and knocker means fixed to a piston rod of the air cylinder means.

6. An apparatus as claimed in claim 1, wherein the crack developing means comprises an air cylinder means for knocking an undersurface of the plate glass through the belt, the undersurface opposing the surface of the plate glass on which the cutting line is formed.

7. An apparatus as claimed in claim 1, wherein the second moving means comprises linear-sliding means for moving the glass support means and the crack developing means linearly in the second plane parallel to the surface of the plate glass, and rotating means for rotating the glass support means and the crack developing means in the second plane parallel to the surface of the plate glass, the linear-sliding means including a slider attached to the glass support means.

* * * * *